United States Patent Office 3,528,965
Patented Sept. 15, 1970

3,528,965
PENICILLIN ESTER PROCESS AND PRODUCTS
Martin Cole, Betchworth, Frank Peter Doyle, Leatherhead, and Maurice John Soulal, Hinchley Wood, England, assignors to Beecham Group Limited, Brentford, Middlesex, England, a British company
No Drawing. Filed Feb. 9, 1968, Ser. No. 704,242
Int. Cl. C07d 99/14, 99/16
U.S. Cl. 260—239.1                             7 Claims

ABSTRACT OF THE DISCLOSURE

There is provided a process for preparing a penicillin of the Formula I:

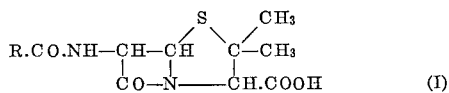
$$\text{CO-N}\quad\quad\text{CH.COOH} \tag{I}$$

and non-toxic salts thereof, wherein R.CO— is an organic acyl radical, which process comprises subjecting a penicillin ester of the Formula II:

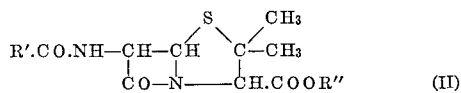
$$\text{CO-N}\quad\quad\text{CH.COOR''} \tag{II}$$

wherein R' is an organic radical, and R'' is an organic ester group that can be removed chemically or enzymatically under mild conditions without destruction of the penicillin nucleus, either to the action of a deacylase enzyme or to the action of reagents that form a 6-iminoether and treating this ether with a hydroxylic reagent, to give a 6-aminopenicillanic acid ester of the Formula III:

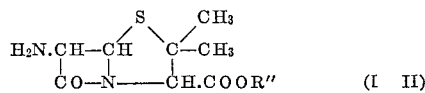
(I II)

wherein R'' is as defined above and then coupling this ester with an acid of the Formula IV:

$$\text{R.COOH} \tag{IV}$$

wherein R is as defined above, and finally removing the ester group R'' chemically or enzymatically, and if desired, converting the penicillin to a non-toxic salt.

---

This invention relates to a general process for the preparation of pencillins, many of which are valuable antibacterial agents.

Accordingly the present invention provides a process for preparing penicillins of the general Formula I:

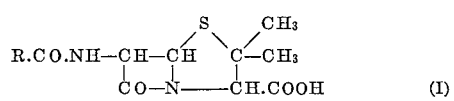
$$\text{CO-N}\quad\quad\text{CH.COOH} \tag{I}$$

and non-toxic salts thereof, wherein R.CO— is an organic acyl radical, which process comprises subjecting a penicillin ester of the general Formula II:

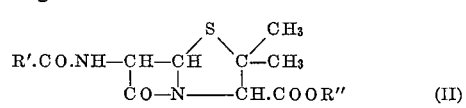
$$\text{CO-N}\quad\quad\text{CH.COOR''} \tag{II}$$

whereing R' is an organic radical, and R'' is an organic ester group that can be removed chemically or enzymatically under mild conditions without destruction of the penicillin nucleus, either to the action of a deacylase enzyme or to the action of reagents that form a 6-iminoether and treating this ether with a hydroxylic reagent, to give a 6-aminopenicillanic acid ester of the general Formula III:

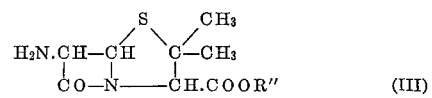
(III)

and then coupling this ester with an acid of the general Formula IV:

$$\text{R'·COOH} \tag{IV}$$

wherein R is as defined above, and finally removing the ester group R'' chemically or enzymatically, and if desired, converting the penicillin to a non-toxic salt.

The salts are non-toxic salts including non-toxic metallic salts such as sodium, potassium, calcium and aluminium, the ammonium salt and substituted ammonium salts, e.g. salts of such non-toxic amines as trialkylamines, including triethylamine, procaine, dibenzylamine, N-benzyl-beta-phenethylamine, 1-ephenamine, N,N'-dienzylethylenediamine, dehydroabietylamine, N,N' - bisdehydroabietylethylenediamine, and other amines which have been used to form salts with benzylpenicillin.

The group RCO is an organic acyl group and examples of R include alkyl, aryl, aralkyl, cycloalkyl, alicyclic and heterocyclic groups, all of which may be substituted.

In the starting ester of Formula II R' is an organic group which may be substituted, and is especially a benzyl, 2-thienylmethyl or 2-furylmethyl group. The ester group R'' is of such a nature that it can be removed chemically or enzymatically under mild conditions, and typical groups include benzyl, cyanomethyl and phenacyl and substituted derivatives thereof. The starting esters (II) may be prepared by esterification of the corresponding acids, which may be themselves prepared by a fermentation process involving the use of an appropriate side chain precursor.

The deacylase enzymes used to remove the acyl group R'CO are those well-known in the art, and particularly suitable are the enzymes produced by bacteria such as strains of *Escherichia coli, Proteus rettgeri, Alcaligenes faecalis, Pseudomonas sp.* and *Achromobacter sp.*

Alternatively, the ester of Formula II is treated with reagents that form a 6-imino bond, especially with acid halides such as phosphorus pentachloride, and the 6-imino compound is treated with a lower alkanol to form the 6-imino ether, then treatment with a hydroxylic solvent gives the 6-imino group.

The coupling of the ester of Formula III with the acid of Formula IV may be effected directly, for example by using N,N'-dicyclohexylcarbodiimide as condensing agent, or by using a reactive derivative of the acid R COOH, for example a halide, anhydride or mixed anhydride.

The final removal of the ester group R'' is effected either chemically, for example by hydrogenolysis when R'' is benzyl or cyanomethyl, or enzymatically by using an esterase.

The resulting penicillins are recovered from the reaction media in the usual way, with purification as necessary. If desired, they may be converted to non-toxic salts, and these are recovered.

The following Examples 1, 2 and 3 describe the preparation of starting materials, and Examples 4 to 22 illustrate the invention.

EXAMPLE 1

The potassium salt of benzylpenicillin (111.6 g.,) was suspended in dimethylformamide (500 ml.), methyl iodide (18.6 ml.) was added and the reaction mixture was stirred for 6 hours at room temperature. It was then poured into water (2 ml.) and the precipitated oil extracted with benzene (3×250 ml.).

The benzene was removed in vacuo and the residue oil treated with isopropanol (100 ml.) and allowed to crystallise at room temperature overnight. The solid ester was collected, washed with isopropanol (10 ml.) and then recrystallised from the same solvent (100 ml.).

The white crystals were collected, washed and dried in an air over at 40° C. overnight to give 67.3 g. (58%) of the methyl ester of benzylpenicillin, M.P. 99–150° C.; $[\alpha]_D^{20}+245.8°$ (c., 1 in acetone); water content 0.14%; chemical assay 97.0%.

EXAMPLE 2

The sodium salt of benzylpenicillin (100 g.) was dissolved in dimethylformamide (500 ml.), phenacyl chloride (43.3 g.) was added and the reaction kept at 5° C. overnight. It was then poured into McIlvaine's neutral buffer solution (2.3 l.) and extracted with benzene (2×500 ml.). The combined benzene extracts were dried over anhydrous magnesium sulphate. To the dried benzene solution was added light petroleum (B.P. 60–80° C.) slowly to the point of incipient turbidity and then allowed to stand for 1 hour at room temperature to complete crystallisation.

The crystals were collected, washed with benzene; petroleum ether mixture (2.1 g., 100 ml.) and dried to give 85.6 g. (67%) of phenacyl ester of benzylpenicillin, M.P. 139–140° C.; $[\alpha]_D^{20}+159.3°$ (c., 1 in chloroform); chemical assay 96.7%.

EXAMPLE 3

The sodium salt of benzylpenicillin (113.6 g.) was dissolved in dimethylformamide (568 ml.), chloroacetonitrile (24 g.) was added and the mixture was stirred overnight at room temperature. The reaction mixture was poured into water (2.5 l.) and extracted with benzene (4×500 ml.). The combined benzene extracts were dried over anhydrous magnesium sulphate and then evaporated in vacuo to give an oil consisting of the cyanomethyl ester of benzylpenicillin, chemical assay 75%.

EXAMPLE 4

Twenty mg. of benzylpenicillin methyl ester was dissolved in 1 ml. ethyl alcohol, which was then diluted with 9 ml. of pH 7 M/20 phosphate buffer to give a suspension. The penicillin acylase-containing bacterial cells of *E. coli* BRL 1040/351 were then added so as to give a final density of bacterial cells of 2 N. (1 N is the density of cells contained in the fermentation from which the cells were collected by centrifugation). The reaction mixture was shaken for 4 hours at 30° C. by which time chromatographic analysis showed complete conversion of benzylpenicillin methyl ester into 6-aminopenicillanic acid methyl ester. Paper chromatography (butanol/ethanol/water, 4/1/5 v./v. top phase) of the reaction mixture before addition of the enzyme showed a small zone at $R_f$ 0.95 after contacting and incubating the chromatogram with agar seeded with *B. subtilis* (bio-autogram method). After a reaction of 4 hours a similar bio-autogram showed no zone of antibacterial activity whatsoever. However, a duplicate chromatogram of this 4-hour reaction mixture when sprayed with 5% aqueous bicarbonate, 5% phenylacetyl chloride in acetone and 5% aqueous bicarbonate in that order, before contacting with seeded agar, showed a new zone of antibacterial activity at $R_f$ 0.8.

The lack of antibacterial activity of this compound before phenylacetylation, the formation of antibacterial activity after phenylacetylation and the position of this zone on the chromatogram are all consistent with the compound being the methyl ester of 6-aminopenicillanic acid. A very small amount of 6-aminopenicillanic acid (10–20 μg./ml., $R_f$ 0.1) was formed during the reaction. This 6-aminopenicillanic acid could have arisen by decomposition of 6-aminopenicillanic acid methyl ester into 6-aminopenicillanic acid or decomposition of benzylpenicillin methyl ester into benzylpenicillin followed by enzymatic deacylation to 6-aminopenicillanic acid.

The above reaction mixture, that is, benzylpenicillin methyl ester plus *E. coli* enzyme, was also examined by thin layer chromatography using silica gel plates and butanol/ethanol/water 4/2/2. The various compounds were detected by spraying the plate with starch/iodine spray. This chromatogram showed a zone of benzylpenicillin methyl ester at $R_f$ 0.88 before treatment with *E. coli* enzyme. After reaction with the enzyme for 4 hours this zone had completely disappeared and a new one at $R_f$ 0.64 had appeared. The position of this zone on the chromatogram was consistent with it being 6-aminopenicillanic acid methyl ester.

The 6-aminopenicillanic acid methyl ester was isolated from a similar reaction-mixture to that described above, by centrifuging off the bacterial cells and extracting the supernatant with methyl isobutyl ketone (2×½ volume) from which solid 6-aminopenicillanic acid methyl ester was obtained by evaporation to dryness. Paper chromatography of the ketone extract showed that it contained a compound running at $R_f$ 0.69 in butanol/acetic acid/water 12/3/5 and $R_f$ 0.85 in butanol/ethanol/water 4/1/5 v./v. top phase. This compound only became biologically active after phenylacetylation, which is consistent with it being the methyl ester of 6-aminopenicillanic acid.

EXAMPLE 5

A reaction mixture was set up and analysed exactly as described in Example 4, except that 2-furylmethylpenicillin methyl ester was used as substrate. Bio-autogram of the reaction mixture showed complete disappearance of the penicillin ester ($R_f$ 0.89) and the appearance of a new zone at $R_f$ 0.8, which only became visible as a biologically active zone after spraying the chromatogram with phenylacetyl chloride. This observation is consistent with the new zone being 6-aminopenicillanic acid methyl ester which on treatment with phenylacetyl chloride was converted into benzylpenicillin methyl ester.

The amount of 6-aminopenicillanic acid formed during the enzyme reaction was very small (10 μg./ml.) and only appeared at $R_f$ 0.1 after treating the bio-autogram with phenylacetyl chloride. Some of this 6-aminopenicillanic acid may have arisen by enzymic deacylation of the very small amount of 2-furylmethylpenicillin ($R_f$ 0.28) which was present in the preparation of the ester.

Thin layer chromatographic examination of the reaction mixture showed the zone of 2-furylmethylpenicillin methyl ester ($R_f$ 0.84) to disappear completely on treatment with the *E. coli*, penicillin acylase and a zone of 6-aminopenicillanic acid methyl ester to appear at $R_f$ 0.61.

EXAMPLE 6

A reaction mixture was set up and analysed exactly as described in Example 4 except that benzyl penicillin phenacyl ester was used as substrate. Paper chromatography (bio-autogram) of the reaction mixture after 4 hours revealed almost complete loss of benzylpenicillin phenacyl ester ($R_f$ 0.92) and formation of a new zone ($R_f$ 0.84) which became biologically active only after spraying the chromatogram with phenylacetyl chloride. The position of this zone on the chromatogram and the fact that it only became biologically active after phenylacetylation are consistent with it being the phenacyl ester of 6-aminopenicillanic acid.

EXAMPLE 7

A reaction mixture was set up and analysed exactly as described in Example 4, except that benzylpenicillin acetoxymethyl ester was used as substrate and the pH was 6.0. Paper chromatography (bio-autogram) of the reaction mixture after 4 hours revealed a large reduction in the amount of benzylpenicillin acetoxymethyl ester ($R_f$ 0.92) and the formation of a new zone ($R_f$ 0.75), which became biologically active only after spraying the chromatogram with phenylacetyl chloride. The position of this zone on the chromatogram and the fact that it only became biologically active after phenylacetylation are consistent with it being the acetoxymethyl ester of 6-aminopenicillanic acid.

EXAMPLE 8

A reaction mixture was set up and analysed as described in Example 4, except that benzylpenicillin benzyl ester was used as substrate and the pH was 6.0. Bioautograms of the reaction mixture after 4 hours revealed a reduction in the amount of benzylpenicillin benzyl ester ($R_f$ 0.97) and the formation of a new zone ($R_f$ 0.9), which became biologically active only after spraying the chromatogram with phenylacetyl chloride. The position of the new zone and the fact that it only became biologically active after phenylacetylation are consistent with it being the benzyl ester of 6-aminopenicillanic acid.

EXAMPLE 9

A reaction mixture was set up exactly as described in Example 4 except that benzylpenicillin acetonyl ester was used as substrate. It was examined by paper chromatography (bio-autogram, butanol/acetic acid/water 12/3/5 v./v.). After 2½ hours at 30° C. the bio-autograms revealed a considerable reduction in the amount of benzylpenicillin in acetonyl ester ($R_f$ 0.94) and the appearance of a new zone ($R_f$ 0.67), which only became biologically active after treatment with phenylacetyl chloride. Also present on the chromatogram was a zone of 6-aminopenicillanic acid, probably formed from benzylpenicillin present in the preparation. The position of the zone at $R_f$ 0.67 and the fact that it only became biologically active on conversion to the phenylacetyl derivative are consistent with it being the acetonyl ester of 6-aminopenicillanic acid.

EXAMPLE 10

Fifty mg. of benzylpenicillin diethylaminoethyl ester hydroiodide was dissolved in 10 ml. water and the pH adjusted and maintained in the range 5.5–6.0. Penicillin acylase-containing cells of *E. coli* BRL 1360 were then added to give a final level of 10 N. After shaking the reaction mixture at 35° C. for 1 hour, ⅕ dilution was made before examining the solution by the bio-autographic method as described in Example 4. This examination showed a considerable reduction in the amount of penicillin ester ($R_f$ 0.78) and the formation of a new zone ($R_f$ 0.37), which only became biologically active after treating the chromatogram with phenylacetyl chloride as described in Example 4. The position of this zone on the chromatogram and the fact that it only became biologically active after phenylacetylation is consistent with it being the diethylaminoethyl ester of 6-aminopenicillanic acid. Chromatography also showed the presence of a very small amount of 6-aminopenicillanic acid ($R_f$ 0.14) in the reaction mixture. If the reaction is carried out at higher pH, i.e. 7 or above, the penicillin ester undergoes considerable alkaline de-esterification to benzylpenicillin, which is then converted to 6-aminopenicillanic acid by the penicillin acylase. The enzyme-containing reaction mixture must therefore be maintained at a pH below 7 to avoid the formation of large amounts of 6-aminopenicillanic acid. The 6-aminopenicillanic acid ester is not formed from penicillin ester at any of the above mentioned pH values unless the penicillin acylase enzyme is present.

After removing bacterial cells by centrifugation the following tests were carried out on the reaction mixture. Perculation down a resin column of De-Acidite FF in the chloride form removed the small amount of 6-aminopenicillanic acid in the preparation but not the 6-aminopenicillanic acid ester. This is consistent with the latter compound not having a free carboxyl group. Storage at pH 2 and 37° C. for ½ hour had little effect on the 6-aminopenicillanic acid ester, but destroyed the residual penicillin ester in the reaction mixture. Treatment with a final concentration of 1% of the supernatant of a α-lactamase-producing culture of *B. cereus* at 37° C. and pH 6–7 caused very little destruction of 6-aminopenicillanic acid ester, but considerable loss of 6-aminopenicillanic acid and of the residual penicillin ester in the reaction mixture. Storage at pH 8 and 37° C. for 1 hour caused large accumulation of 6-aminopenicillanic acid which is consistent with the de-esterification of 6-aminopenicillanic acid ester in the reaction mixture by the alkaline pH conditions.

EXAMPLE 11

A reaction mixture was set up and analysed as described in Example 4 except that benzylpenicillin thioethyl ester was used as substrate. The reaction mixture was also analysed using the paper chromatographic solvent system n-butanol/pyridine/water, 1/1/1 v./v. After 4 hours at 30° C. and pH 7.0, paper chromatography showed complete conversion of the benzylpenicillin thioethyl ester into a new compound, which only became biologically active after spraying the chromatogram with phenylacetyl chloride. This observation, coupled with the position of the zone on the chromatogram is consistent with the new compound being 6-aminopenicillanic acid thioethyl ester. The original preparation of benzylpenicillin thioethyl ester was contaminated with a small amount of benzylpenicillin and another compound, believed to be thiobenzylpenicillin. After reaction with *E. coli* acylase these two compounds were respectively converted into small amounts of 6-aminopenicillanic acid and what was believed to be thio-6-aminopenicillanic acid.

The $R_f$ of the various compounds were as follows:

| Compound | Butanol/ethanol/water | Butanol/pyridine/water |
|---|---|---|
| Benzylpenicillin thioethyl ester | 0.94 | 0.94 |
| 6-aminopenicillanic acid thioethyl ester | 0.85 | 0.85 |
| Thiobenzylpenicillin | 0.74 | 0.85 |
| Thio-6-aminopenicillanic acid | 0.45 | 0.72 |
| Benzylpenicillin | 0.45 | 0.74 |
| 6-aminopenicillanic acid | 0.14 | 0.48 |

EXAMPLE 12

Seven g. of the methyl ester of benzylpenicillin were dissolved in 70 ml. of dimethylformamide. This solution was run slowly from a dropping funnel into 800 ml. of 4 N suspension of *E. coli* BRL 1040/351 cells in 10% dimethylformamide in water. The 4 N suspension of bacterial cells was obtained by centrifuging the bacteria from 3,200 ml. of cultivation medium and resuspending them in 800 ml. of dimethylformamide. (i.e. 4 times normal concentration.)

The reaction mixture was stirred at 35° C. and the pH maintained in the region of 6.9–7.0 by continuous addition of N/1 sodium hydroxide. After three hours 21 ml. of N/1 sodium hydroxide had been added, which is slightly in excess of the theoretical requirement.

The reaction mixture was filtered using a diatomaceous earth filter aid to remove the bacterial cells, the pH was adjusted to 2.0 and the solutions were extracted with 3× ⅓ volume methyl isobutyl ketone to remove phenylacetic acid. After this extraction, the aqueous phase was returned to pH 7.5 and the 6-aminopenicillanic acid methyl ester was extracted from the solution with 3× ⅓ volume methyl isobutyl ketone. The methyl isobutyl ketone extracts were combined and filtered through a bed of anhydrous sodium sulphate.

Paper chromatograms of this methyl isobutyl ketone extract when contacted with agar seeded with *B. subtilis* revealed no zone of bioactivity. However, the duplicate chromatograms, when phenylacetylated showed a single zone of biological activity at $R_f$ 0.66. This appearance of biological activity after acylation with phenylacetyl chloride, and the position of the zone on the bio-autogram are consistent with the methyl isobutyl ketone extract containing 6-aminopenicillanic acid methyl ester.

The enzymatic reaction was followed by bioautographic means and showed the complete conversion of benzylpenicillin methyl ester ($R_f$ 0.93 bioactive) into 6-aminopenicillanic acid methyl ester ($R_f$ 0.69 bio-inactive except after phenylacetylation) and some 6-aminopenicillanic acid ($R_f$ 0.4 bio-inactive except after phenylacetylation). All the $R_f$ values refer to n-butanol/acetic acid/water solvent system.

EXAMPLE 13

Two g. of the phenacyl ester of benzylpenicillin was dissolved in 20 ml. of dimethylformamide. This solution was run drop-wise into 200 ml. of a 5 N suspension of *E. coli* BRL 1040/351 cells in 10% aqueous dimethylformamide (5 N=bacterial cells from the 5 volumes of culture fluid resuspended in one volume of solution). The reaction was stirred at 35° C. and the pH maintained at 7.0 by the addition of N/5 sodium hydroxide. The reaction was followed by measuring the rate of uptake of N/5 sodium hydroxide, which became very slow after 7 hours. At 10 hours, 24 ml. of N/5 sodium hydroxide had been added, which is in excess of the requirement for the neutralization of the released phenylacetic acid.

The reaction mixture was filtered through a bed of diatomaceous earth filter aid to remove the bacterial cells and extracted with 1 volume methyl isobutyl ketone at pH 2.0 to remove phenylacetic acid. The aqueous phase after separation was returnd to pH 7.5 and extracted with 3× ½ volume methyl isobutyl ketone and the methyl isobutyl ketone extracts were combined.

The bioautogram of the methyl isobutyl ketone extract showed no zone of biological activity. However, a duplicate chromatogram when phenylacetylated showed a single zone of bioactivity at $R_f$ 0.87. This conversion from an inactive to a bioactive substance on phenylacetylation, and the position of the new zone on the chromatogram are consistent with the product being the phenyacyl ester of 6-aminopenicillanic acid.

The enzymic reaction was followed by bioautographic means and showed complete conversion of phenacyl ester of benzylpenicillin ($R_f$ 0.95 bioactive) into 6- aminopenicillanic acid phenacyl ester ($R_f$ 0.75, bioinactive except after phenylacetylation), and some 6-aminopenicillanic acid ($R_f$ 0.46 bioinactive except after phenylacetylation). All $R_f$ values refer to the n-butanol/acetic acid/water solvent system.

EXAMPLE 14

150 g. of a viscous liquid preparation of the cyanomethyl ester of benzylpenicillin were dissolved in a mixture of 2.75 l. dimethylformamide and 2.1 water. 141 of a 3 N suspension of *E. coli* BRL 1040/351 cells in water was also prepared (3 N=bacterial cells from 3 volumes of a culture fluid resuspended in 1 volume of solution). 2 l. of 10% dimethylformamide were placed in a jacketed tank, and warmed to 35° C. The cyanomethyl ester solution and the *E. coli* suspension were run into the tank at a constant rate for 4 hours while maintaining a pH of 6.8–7.0 with approximately 5 N sodium hydroxide solution.

The reaction mixture was chilled, filtered through a diatomaceous earth filter aid, the pH was lowered to 2.0 with hydrochloric acid, and extracted with a half volume methyl isobutyl ketone to remove phenylacetic acid. After separation of the phases the aqueous phase was adjusted to pH 7.5 and extracted with 4× ½ volume methyl isobutyl ketone. The four methyl isobutyl ketone extracts were combined and concentrated to 500 ml.

The bioautogram of the methyl isolbultyl ketone extract showed a small bioactive zone of cyanomethyl ester of benzylpenicillin ($R_f$ 0.91). However, the phenylacetylated duplicate chromatogram showed in addition a zone of bioactivity at $R_f$ 0.66. This conversion from an active to a bioactive substance on phenylacetylation and the position of this $R_f$ 0.66 zone are consistent with the product of the reaction being the cyanomethyl ester of 6-aminopenicillanic acid.

The enzymic reaction was followed by bioautographic means which showed incomplete conversion of the cyanomethyl ester of benzylpenicillin ($R_f$ 0.91 bioactive) to the cyanomethyl ester of 6-aminopenicillanic acid ($R_f$ 0.65 bioinactive, except after phenylacetylation) and some 6-aminopenicillanic acid ($R_f$ 0.39 bioinactive except after phenylacetylation). All $R_f$ values refer to the n-butanol/acetic acid/water solvent system.

EXAMPLE 15

A methyl isobutyl ketone solution of the methyl ester of 6-aminopenicillanic acid (containing approximately 1 g.) was dried over magnesium sulphate. The dried solution was filtered, cooled to 0° C. and triethylamine (0.6 ml.) and α-phenoxypropionyl chloride (0.7 ml.) were added and the mixture stirred for 1 hour.

The reaction mixture was washed with water (1× 50 ml.), sodium bicarbonate solution (2× 50 ml.), water (1× 50 ml.) and then driver over magnesium sulphate. The dried solution was evaporated to dryness and the residue dissolved in ether (10 ml.) and allowed to crystallise overnight. The product was shown to be the methyl ester of α-phenoxyethylpencillin by biochromatography and mixed melting point with an authentic sample of the methyl ester, which was prepared as follows:

The potassium salt of α-phenoxyethylpencillin (201.3 g.) was suspended in dimethylformamide (1250 ml.) and methyl iodide (71 g.) added with stirring. The reaction mixture was stirred for 18 hours at room temperature and then poured into water (6.25 l.) and extracted with benzene (3× 1 l.). The combined benzene extracts were washed with water (2× 600 ml.). The benzene was removed in vacuo, the last traces under high vacuum. The residue was dissolved in ether and allowed to crystallise at room temperature overnight, filtered and washed with ether (100 ml.). Yield 112 g. (59%); M.P. 95–97° C.; $[\alpha]_D^{20}+170.6°$ (c., 1 in chloroform).

EXAMPLE 16

α-Phenoxyethylpencillin was found to be rapidly released from its methyl ester by incubation in guinea pig blood or guinea pig liver homogenate. Rat liver homogenate was less active and human serum showed only a small amount of activity at pH 7.

Reaction mixtures consisted of 5 ml. of 4 mg./ml. α-phenoxyethylpencillin methyl ester in M/20 phosphate buffer at pH 7 (first dissolved in acetone and then added to the phosphate buffer such that the final concentration of acetone was 0.25% in the reaction mixture) plus 5 ml. of an homogenate of guinea pig liver or 5 ml. of whole guinea pig blood or 5 ml. of M/20 pH 7 phosphate buffer (control). A guinea pig was anaesthetized, heparinized and the blood removed and immediately used in the preparation of the above reaction mixture. After killing the guinea pig with Nembutal the liver was removed and homogenised at the rate of 1 g. liver to every 4 ml. M/20 pH 7 phosphate buffer. This suspension was used in the above reaction mixture. Other reaction mixtures and controls were set up at pH 5 and 6 and all reaction mixtures were incubated at 37° C. At the beginning of the reaction and after 1 hour and 4 hours, samples were examined by paper chromatography by using the butanol/ethanol/water (4/1/5 v./v. top phase) solvent system, antibacterial zones being detected by contact with agar seeded with *B. subtilis* (bioautograph).

This chromatography revealed the formation of α-phenoxyethylpenicillin ($R_f$ identical with an authentic α-phenoxyethylpenicillin marker) in the reactions containing blood and liver homogenate, but not in the phosphate buffer control. Formation was more rapid in blood at pH 7 than at pH 5. About 20% conversion of 2 mg./ml. had taken place in 4 hours at pH 7. α-Phenoxyethylpenicillin methyl ester had an $R_f$ of 0.95 and was very low in biological activity. α-Phenoxyethylpenicillin had an $R_f$ of 0.4.

EXAMPLE 17

The penacyl ester of 6-aminopenicillanic acid was converted to the phenacyl ester of α-phenoxyethylpenicillin by a similar method to that described in Example 15. The identity of the product was confirmed by comparison with an authentic sample of the phenacyl ester, which was prepared as follows:

The potassium salt of α-phenoxyethylpenicillin (7.0 g.) was suspended in dimethylformamide (100 ml.) and phenacyl chloride (2.7 g.) added with stirring. The reaction mixture was stirred for 18 hours at room temperature and then poured into McIlvaine's neutral buffer (500 ml.) and extracted with benzene (2× 100 ml.). The combined benzene extracts were washed with water (1× 25 ml.) and then dried over anhydrous magnesium sulphate. The benzene was removed in vacuo and the residual oil stirred with light petroleum (B.P. 40–60° C.). The solvent was decanted off and the residue dissolved in acetone and the oil precipitated by addition of light petroleum (B.P. 40–60° C.). After decanting the solvents the last traces of solvent were removed under high vacuum to give a glassy product. Yield 5.8 g. (69%).

EXAMPLE 18

The cyanomethyl ester of 6-aminopenicillanic acid was converted to the cyanomethyl ester of α-phenoxyethylpenicillin by a similar method to that described in Example 15. The identity of the product was confirmed by comparison with an authentic sample of the cyanomethyl ester, which was prepared as follows:

The potassium salt of α-phenoxyethylpenicillin (70 g.) was suspended in dimethylformamide (500 ml.) and chloroacetonitrile (13.1 g.) was added with stirring. The reaction mixture was stirred for 22 hours at room temperature and then poured into water (1500 ml.) and extracted with benzene (2× 300 ml.) The combined benzene extracts were washed with water (1× 50 ml.). The benzene was removed in vacuo to give a viscous oil, which was washed with light petroleum B.P. 40–60° C. (4× 150 ml.). The last traces of solvent were removed under high vacuum to give a very viscous oil. Yield 56.5 g. (75%).

EXAMPLE 19

The phenacyl ester of α-phenoxyethylpenicillin (5.0 g.) and sodium thiophenoxide (2.9 g.) were dissolved in dimethylformamide (20 ml.) and stirred at room temperature for 30 mins. Water (100 ml.) was added, the pH adjusted to 7.0 and the mixture washed with methyl isobutyl ketone (50 ml.), which was discarded. The aqueous layer was acidified to pH 2.0 and extracted with methyl isobutyl ketone (2× 50 ml.). The combined extracts were washed with water (1× 100 ml.) and then extracted with N potassium bicarbonate solution to pH 7.5. The aqueous layer was freeze dried to give a product which by biochromatography was shown to be α-phenoxyethylpenicillin. Weight yield 3.7 g. (89%).

EXAMPLE 20

The cyanomethyl ester of α-phenoxyethylpenicillin (5 g.) was dissolved in an ether (100 ml.) and water (5 ml.) mixture, 5% palladium/charcoal (7.5 g.) added and the mixture was hydrogenated at atmospheric pressure and room temperature for 3 hours. The catalyst was removed and the ether extracted with N potassium bicarbonate solution to pH 7.5. The aqueous layer was freeze dried to give a product which by biochromatography was shown to be α-phenoxyethylpenicillin. Weight yield 1.0 g. (70%).

EXAMPLE 21

*Aspergillus ochraceous* BRL 731 and *Streptomyces lavendulae* BRL 198 (ATCC 13664) were grown in conical flasks on a rotary shaker for 5 days at 26° C. in the media shown below. The contents of the flasks were then adjusted to pH 7 phenoxymethylpenicillin cyanomethyl ester (first dissolved in acetone) was added to give a final concentration of 5 mg./ml. and the mixture was shaken at 26° C. for 5 hours.

The reaction mixtures were examined at time zero and after 5 hours by paper chromatography by using the n-butanol/acetic acid/water solvent system (12/3/5 v./v.). The chromatograms were contacted with agar seeded with *B. subtilis* to reveal the various components. A duplicate set of chromatograms was sprayed first with aqueous sodium bicarbonate and then with phenylacetyl chloride in acetone before contacting with a seeded agar.

The chromatograms of both reaction mixtures showed the formation of a new substance at $R_f$ 0.66, which only became biologically active after phenylacetylation. The position of this new zone and its lack of biological activity before phenylacetylation are consistent with it being the cyanomethyl ester of 6-aminopenicillanic acid. Both reaction mixtures also contained small amounts of 6-aminopenicillanic acid and large amounts of unconverted phenoxymethylpenicillin cyanomethyl ester. 6-aminopenicillanic acid had an $R_f$ of 0.4 and the phenoxymethylpenicillin cyanomethyl ester an $R_f$ of 0.94. The *Streptomyces lavendulae* reaction mixture contained very much more 6-aminopenicillanic acid cyanomethyl ester than the Aspergillus reaction mixture, which contained only very small amounts.

Culture medium for
| *Aspergillus ochraceous*: | Percent v./v. |
| --- | --- |
| Corn steep liquor cartons | 6.0 |
| Lactose | 5.0 |
| Glucose | 0.5 |
| $NaNO_3$ | 0.1 |
| $KH_2PO_4$ | 0.1 |
| $Na_2SO_4$ | 0.1 |
| $CaCO_3$ | 1.0 |
| Sodium phenoxyacetate (inducer) | 0.1 |

100 ml. of medium was contained in each 500 ml. plain conical flask closed with a cotton plug. The pH was adjusted to 4.8 before sterilization by autoclaving. The flasks were inoculated with a suspension of *Aspergillus ochraceous* obtained from an agar slope culture.

Culture medium for
| *Streptomyces lavendulae*: | Percent w./v. |
| --- | --- |
| Liquid glucose Brown and Polson Globe 3A | 3.0 |
| Soya bean meal | 2.5 |
| Oxoid yeast extract | 0.5 |
| NaCl | 0.5 |
| $CaCO_3$ | 0.2 |

100 ml. of medium was contained in each 500 ml. plain conical flask closed with a cotton plug. The pH was adjusted to 7.3 before sterilization by autoclaving. The flasks were inoculated with a suspension of *Streptomyces lavendulae* obtained from an agar slope culture.

EXAMPLE 22

The phenacyl, methyl and cyanomethyl esters of 6-aminopenicillanic acid were converted to the corresponding esters of α-phenoxypropylpenicillin, 2,6-dimethoxyphenylpenicillin, 3-(o-chlorophenyl)-5-methyl-4-isoxazolylpenicillin and 3-(2,6-dichlorophenyl)-5-methyl-4-isoxazolylpenicillin by a similar method to that described in Example 15, and removal of the ester group gave the corresponding pencillin. Reaction of the three esters with the mixed anhydride from D(−)-α-(carbobenzoxyamino) phenylacetic acid and ethyl chloroformate gave the corresponding esters of D(−)-α-(carbobenzoxyamino)-benzylpenicillin, and removal of the protecting group and the ester group gave D(−)-α-aminobenzylpenicillin.

We claim:
1. A process for preparing a penicillin of the Formula I:

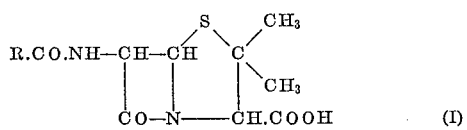

or a non-toxic salt thereof, wherein R in the R CO— group is selected from phenyl, benzyl, phenoxymethyl, phenoxyethyl, phenoxypropyl, thienylmethyl, furylmethyl, dimethoxyphenyl, aminobenzyl and chlorophenylmethylisoxazyl, which process comprises, in combination, de-acylating a penicillin ester of the Formula II:

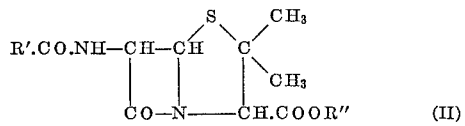

wherein R' has the same meaning as R, and R" is selected from benzyl, cyanomethyl, phenacyl and methyl, to give a 6-aminopenicillanic acid ester of the Formula III:

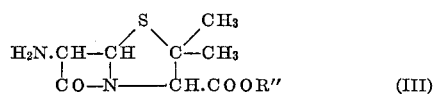

wherein R" is as defined above and then coupling this ester with an acid of the Formula IV:

wherein R is as defined above, and finally removing the ester group R" and converting the penicillin to a non-toxic pharmaceutically acceptable salt when the salt form of the penicillin is desired.

2. A process as claimed in claim 1, wherein the acyl group R'CO is removed from the ester of Formula II by treatment with an enzyme derived from *Escherichia coli, Proteus rettgeri, Alcaligenes faecalis,* Pseudomonas sp. or Achromobacter sp.

3. A process as claimed in claim 1, wherein the acyl group R'CO is removed from the ester of Formula II by treatment with an acid halide then with a lower alkanol to form a 6-imino ether, followed by treatment with a hydroxylic reagent.

4. A process as claimed in claim 1, wherein the 6-aminopenicillanic acid ester of Formula III is coupled with the acid R.COOH by using a condensing agent or by using a halide, anhydride or mixed anhydride of the acid.

5. A process as claimed in claim 1, wherein the ester group R" is removed by catalytic hydrogenation when it is a benzyl or cyanomethyl group.

6. 6-aminopenicillanic acid cyanomethyl ester.

7. α-Phenoxyethylpenicillin cyanomethyl ester.

References Cited
UNITED STATES PATENTS 3,399,207   7/1968   Bamberg et al. _____ 260—239.1

NICHOLAS S. RIZZO, Primary Examiner

U.S. Cl. X.R.

195—36; 260—306.7